United States Patent [19]

Kanamaru et al.

[11] Patent Number: 5,239,751
[45] Date of Patent: Aug. 31, 1993

[54] METHOD OF PRODUCING NOZZLE FOR SOLENOID VALVE

[75] Inventors: Hisanobu Kanamaru; Mizuho Yokoyama, both of Katsuta; Atsushi Koshizaka, Nakaminato; Kenichi Gunji, Tsunesumi, all of Japan

[73] Assignees: Hitachi, Ltd., Tokyo; Hitachi Automotive Engineering Co., Ltd., Katsuta, both of Japan

[21] Appl. No.: 796,671

[22] Filed: Nov. 25, 1991

[30] Foreign Application Priority Data

Nov. 24, 1990 [JP] Japan ................... 2-318644

[51] Int. Cl.⁵ .................. B21K 1/20; B23P 13/00
[52] U.S. Cl. .................. 29/888.44; 29/890.122; 29/890.142; 249/114.1
[58] Field of Search ......... 29/888.44, 888.45, 888.451, 29/890.1, 890.122, 890.126, 890.128, 890.13, 890.132, 890.142, 557, 890.143; 72/462; 249/114.1

[56] References Cited

U.S. PATENT DOCUMENTS

| | | | |
|---|---|---|---|
| 2,029,508 | 2/1936 | Scrimgeour | 29/888.451 |
| 2,618,989 | 11/1952 | Cupler, II | 29/890.142 X |
| 3,141,358 | 7/1964 | Burke, Jr. et al. | 29/890.142 X |
| 4,425,777 | 1/1984 | Jaglinski | 29/890.1 X |
| 4,479,505 | 10/1984 | Kasprik et al. | 29/890.13 X |
| 4,574,445 | 3/1986 | Bentin et al. | 29/890.1 |
| 5,092,558 | 3/1992 | Katsura | 249/114.1 |
| 5,109,823 | 5/1992 | Yokoyama et al. | 29/890.142 X |
| 5,127,156 | 7/1992 | Yokoyama et al. | 29/890.142 X |

FOREIGN PATENT DOCUMENTS 0163575 10/1982 Japan ................... 29/890.1

Primary Examiner—Timothy V. Eley
Assistant Examiner—C. Martin
Attorney, Agent, or Firm—Antonelli, Terry, Stout & Kraus

[57] ABSTRACT

A method of producing a cylindrical nozzle incorporated in a fuel injection valve for an internal combustion engine including the steps of: setting a cylindrical nozzle blank on a second die so that a lower bottom face of the cylindrical nozzle blank rests on the second die; pressing a punch into the cylindrical nozzle blank while being guided along the inner wall face of the cylindrical nozzle blank; pressing the punch onto a bottom of the cylindrical nozzle blank to induce plastic flow, thereby transfer forming a seat portion at a center on the upper bottom face of the cylindrical nozzle blank; removing a projection formed on the lower bottom face of the cylindrical nozzle blank due to the plastic flow; boring a nozzle injection hole at the center of the transfer formed seat portion of the projection removed cylindrical nozzle blank; and hardening the bored cylindrical nozzle blank.

11 Claims, 5 Drawing Sheets

METHOD OF PRODUCING NOZZLE FOR SOLENOID VALVE

BACKGROUND OF THE INVENTION

The present invention relates to a method of producing a nozzle for a solenoid valve, and more specifically the preestimation relates to a method of producing a cylindrical nozzle including a bottom having a seat is provided for receiving a valve body.

A solenoid valve is used in many fields for example as a fuel injection valve and oil pressure control valve. Before explaining a conventional production method of a nozzle incorporated with the solenoid valve, a structure of the solenoid valve is illustrated in FIG. 5.

As illustrated in FIG. 5, a solenoid type fuel injection valve feeds fuel into an automobile engine, in which a main body 10 of the fuel injection valve feeds a solenoid coil 11, a yoke 12 for accommodating a core 13 and a nozzle 1 mounted on the lower part of the yoke 12.

At the lower center portion of the yoke 12, is a flow passage aperture 12a is formed which includes a part of a fuel passage. A plunger 14 including a ball type valve body 15 fits into the flow passage aperture 12a while permitting axial reciprocating movement via return spring 17 biasing the valve body 15 to contact a seat portion is provided at the nozzle 1 when the solenoid coil 11 is not energized.

The nozzle 1 is in a shape of cylinder with a bottom, and at the center on the upper face of the bottom, the seat portion 1a of an inverted conical shape and a fuel injection hole 9 are provided. Further, above the upper face of the bottom, a swirler 16 is disposed to guide the reciprocating motion of the valve body 15 and to swirl the fuel.

When the solenoid coil 11 is energized, the plunger 14 includes a magnetic circuit together with the yoke 12 and core 13 and moves via magnetic attraction against the biasing force of the return spring 17 by a predetermined stroke. By this attracting operation, the valve body 15 moves away from the seat portion 1a and opens the valve. Thus, the fuel is swirled and atomized via the swirler 16 and is injected from the fuel injection hole 9.

In such fuel injection valve, the sealing the property between the seat portion 1a and the valve 15 is an important parameter during the valve closing period. Specifically, during the non-energizing period of the solenoid coil 11. An accurate roundness and an accurate surface roughness are required for the seat portion 1a to achieve an accurate seat between seat portion 1a and valve body 15. Generally, a roundness less than 1 $\mu$m and a surface roughness of Rmax 1.0 are necessary for the seat portion 1a of the fuel injection valve.

Now, a conventional method of producing the nozzle of the fuel injection valve, in particular method of forming the seat portion of the nozzle is explained.

The valve body and the seat portion used for a fuel injection valve are subject to frequent opening and closing operations; thus, material having excellent abrasion resistance and corrosion resistance to the fuel are required. Typically, martensite series stainless steel is used as a nozzle blank. However, martensite series stainless steel is known to be a material which is difficult to accurately apply plastic working, therefore in a conventional nozzle production, thereafter a worked blank is hardened and finally the seat portion is polished to finish the seat portion.

Further, for to improve oil tightness, which is a sealing property of the nozzle seat portion a method of polishing is known by placing a lapping material or abrasive grain between the seat portion and the valve body and thereafter rotating one of the seat portion and the valve body to obtain a fit, and by applying burnishing work to the seat portion as disclosed in JP-A-60-119369(1985) which corresponds to U.S. Pat. No. 4,651,926.

As is understood from the above explanation, the conventional nozzle product method necessitates the processes of cutting and polishing the nozzle seat portion which require a longer time than a plastic working.

In particular, with respect to the finishing work of the nozzle seat portion by polishing after the hardening thereof which was carried out for maintaining the oil tightness and dimensional accuracy in the conventional production method, a strict control of the wear of the abrasive is required for maintaining the dimensional accuracy of the seat portion, and further, the working machine must be maintained a state of a high accuracy because of the relatively small diameter of the seat portion. This small diameter requires that work jigs of the working machine operate at a rotational high speed and a high dimensional accuracy. Practicing this method reduces the productivity of the nozzle and increases the production cost.

In the method where lapping material is disposed between the seat portion and the valve body, and either the seat portion or the valve body to obtain a fit is rotated, it takes a long time to complete the fitting work such that problems of low productivity result from this method.

In the method where burnishing work is applied to the seat portion, the burnishing work includes rotating a burnishing jig. As a result the burnishing jig is likely seize the portion to be worked. For preventing such seizure, a jig with a lubricant oil groove is used; however, a problem arises such that an dimensional accuracy of the nozzle seat portion is insufficient because the construction of the jig deviates from the required construction for the nozzle seat portion.

SUMMARY OF THE INVENTION

The present invention solves the above problems. An object of the present invention is to provided a method of producing a nozzle for use with a solenoid valve which ensures that the oil tightness and dimensional accuracy of the nozzle seat portion is achieved and reduces the production cost through improvement of the productivity over the above methods.

In order to achieve the above object, the present invention introduces technical formation of the nozzle seat portion by plastic working on a nozzle blank of a steel material requiring a hardening process thereafter. Such a steel material is martensite series stainless steel. In addition, an object of the present invention improves dimensional accuracy.

A method of producing a nozzle for a solenoid valve in accordance with one aspect of the present invention uses cylindrical nozzle blank made of a steel material which requires a hardening process thereafter such as martensite series stainless steel with a bottom. The method includes the steps of: preparing a punch of cemented carbide having a die for seat portion transfer at top end of the punch and a ceramic coating which is harder than the nozzle blank is applied over the die face; preparing a die including a run off aperture at the center of the upper face of the die for permitting plastic flow through the nozzle blank; setting the nozzle blank on the die such that the lower face of the bottom rests on the die; forcing the punch with the ceramic coating into the cylindrical nozzle blank while being guided along the inner wall of the nozzle blank; and pressing the punch onto the upper bottom face of the nozzle blank to form a seat portion by transferring the die at the top end of the punch onto the center of the upper bottom face of the cylindrical nozzle blank.

A method of producing a nozzle for a solenoid valve in accordance with another aspect of the present invention uses a cylindrical nozzle blank made of a steel material which requires a hardening process thereafter such as martensite series stainless steel with a bottom further comprises, in addition to the above steps, the method further includes steps of: providing a recess located at the center on the lower bottom face of the cylindrical nozzle blank to minimize a pushed out projection located on the lower bottom face of the nozzle blank due to plastic flow of the nozzle blank during the formation of the seat portion via the die transfer; and removing the pushed out projection simultaneously with the formation of the nozzle injection hole which is extruded out after the formation of the seat portion.

In the method of producing a nozzle for a solenoid valve according to the first aspect of the present invention, which uses a material which is difficult to work such as the martensite series stainless steel for the nozzle blank, the punch of cemented carbide being used as the jig for forming the seat portion, the ceramic coating harder than the nozzle blank and having an anti-seizing property to metal is applied over the die face for the seat portion transfer formed at the top end of the cemented carbide punch and the run off aperture located at the center on the upper face of the die to permit the plastic flow of the nozzle blank material to reduce the load applied to the punch. As result of the run off aperture for the plastic flow provided at the center on the upper face of the die, the nozzle blank is uniformly pushed out in a predetermined direction toward the run off aperture while avoiding a complex plastic flow reducing springback and residual stress after the formation of the nozzle. As a result, the seizure of the punch is prevented while the punch is applied to the nozzle blank. Consequently, the transfer formation of the seat portion has a satisfactory degree of roundness.

Further, during the transfer formation of the seat portion the punch is forced in by pressing and is guided into the nozzle blank while closely contacting the inner wall face of the nozzle blank and the transfer formation of the seat portion has no play between the punch and the nozzle blank. As a result, a high degree of concentricity of the inner circle of the cylindrical nozzle blank and the seat portion, the valve body assembled into the nozzle and the seat portion, the valve body assembled into the nozzle and of the seat portion is maintained.

After the formation of the above seat portion, the projection on the lower bottom face is pushed out by the plastic flow of the nozzle blank while the plastic work is removed and a nozzle injection hole is formed at the center of the seat portion and finally the worked nozzle is hardened.

In the method of producing a nozzle for a solenoid valve according to the second aspect of the present invention, the recess provided on the lower bottom face of the nozzle blank is located at the center thereof where the plastic flow of the nozzle blank is received during the plastic work for transfer forming the seat portion. When the back side corresponding to the formed seat portion on the lower bottom face of the nozzle blank is pushed out by the plastic flow, the pushed out portion is substantially transferred through the recess and the pushed out portion hardly forms a projection from the lower bottom face of the nozzle blank and if any the amount of the projection is minimized and position of the possible small projection is controlled to locate at immediately below the center of the seat portion by selecting a proper shape of the recess. As a result, during the formation of the nozzle injection hole at the center of the seat portion carried out thereafter the pushed out projecting portion formed due to the plastic flow of the nozzle blank is simultaneously removed.

According to the present invention, the nozzle for the solenoid valve is produced by plastic work with high accuracy and moreover the production process therefor is realized and the production facility therefor is simplified such that the productivity of the nozzle is improved and the production cost is lowered.

EXPLANATION OF THE PREFERRED EMBODIMENTS

Figure 1:
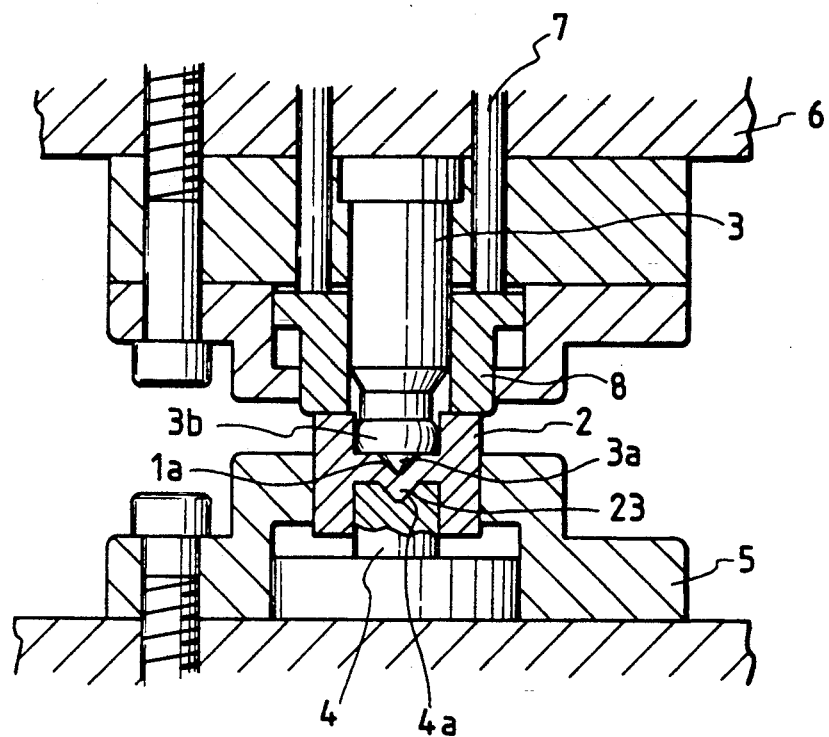
FIG. 1 is a cross section of a press machine loaded with a cylindrical nozzle blank which has been subjected to a plastic work for illustrating a first embodiment of the production method of a cylindrical nozzle for a solenoid valve according to the present invention.
Figure 2:
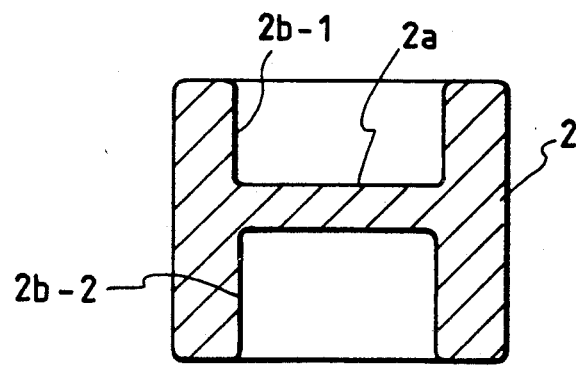
FIG. 2 is a vertical cross section of the cylindrical nozzle blank as illustrated in FIG. 1 but before being subjected to the plastic work.

The embodiments of the present invention are explained with reference to the attached drawings; FIG. 1 illustrates the a first embodiment of a nozzle production method according to the present invention. FIG. 2 is a vertical cross section of a cylindrical nozzle blank in which a cylindrical nozzle to be incorporated with a solenoid valve is produced according to the first embodiment of the present invention and FIGS. 3A through 3D are views for illustrating a process of forming a seat portion on the upper bottom face of the cylindrical nozzle blank in the first embodiment of the cylindrical nozzle production method according to the present invention.

A nozzle blank 2 is made of martensite series stainless steel which permits a hardening treatment and is formed in a cylindrical shape with a bottom portion 2a which constitutes a portion to be worked into a seat portion.

The bottom portion 2a is disposed at intermediate position along the axial direction of the cylindrical nozzle blank 2 in a state of somewhat raised bottom. When forming the seat portion 1a on the bottom portion 2a which will be explained in detail later, a punch 3 is forced into the bottom portion 2a by pressing into the upper inner cylindrical space 2b-1 separated by the bottom portion 2a of the cylindrical nozzle blank 2. A die 4 is set in the lower inner cylindrical space 2b-2, and no nozzle injection hole 9 is formed on the bottom portion 2a until the seat portion 1a is formed thereon.

Now, the jigs for forming the seat portion 1a on the nozzle blank 2 are described. The seat portion forming jigs included the punch 3, the die 4, a guide 5, an upper slide 6 of a hydraulic pressing machine and the knock-out pins 7.

The punch 3 is made of a cemented carbide, the idle 3a having a similar shape as the seat portion 1a to be transferred is formed at the top end of the punch 3, and a ceramic coating such as TiN, TiC, and TiAlN which are harder than the cylindrical nozzle blank 2 is applied at least over the die face of the punch 3. Further, the size of the punch 3 corresponds to an outer portion 3b of the punch 3 which can be forced into the inner cylindrical space 2b-1 of the nozzle blank 2 and the shape of the portion 3b facilitates the entry of the punch 3 into the inner space of the nozzle blank 2 along the inner wall thereof. For instance, the portion 3b of the punch 3 is formed with an arcuate curved face along the axial direction over the entire circumference thereof and the diameter of the intermediate portion of the portion 3b is selected to be substantially the same as that of the inner cylindrical space 2b-1 of the nozzle blank 2, and the diameter of the remaining part of the portion 3b smaller than that at the intermediate portion.

Additionally, at the center on the upper face of the die 4 a run off hole 4a is located to permit the plastic flow of the nozzle blank. The run off hole 4a is also shaped as an inverted conical shape corresponding to the seat portion 1a. The inclination angle $\theta_2$ of the run off hole 4a in the idle 4 is slightly larger than the inclination angle $\theta_1$ of the die 3a formed on the punch 3, that is $\theta_2 > \theta_1$. This is because when $\theta_2$ is selected to be smaller than $\theta_1$ a sufficient compression force to form seat portion 1a can not be obtained during the transfer formation of the seat portion, and the die 3a of the punch 3 may not be accurately transferred onto the portion where the seat portion is to be formed; these problems are voided if angle $\theta_2$ is larger than the angle $\theta_1$.

Hereinafter, the formation of the seat portion 1a is explained. The nozzle blank 3 is guided toward the die 4 via the guide 5 and set thereon, by lowering the punch 3 secured to the upper slide 6; the center portion on the upper bottom face of the nozzle blank 2 is pressed by a load force required for the plastic work.

Figure 3A:
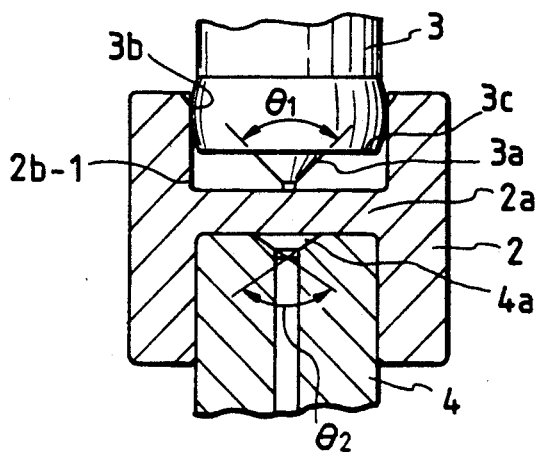
FIGS. 3A through 3D illustrate a process of forming a seat portion on the bottom of the cylindrical nozzle blank in accordance with the first embodiment of the production method of a cylindrical nozzle for a solenoid valve according to the present invention.
Figure 3B:
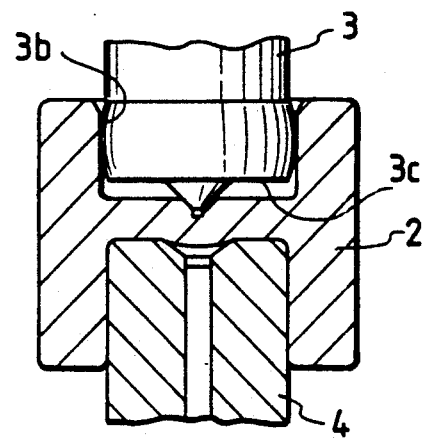

FIGS. 3A through 3D show this seat portion formation process, wherein as shown in FIG. 3A the top end die 3a of the punch 3 initially enters into the cylindrical inner space 2b-1 of the nozzle blank 2 and the punch 3 continues to lower while being forced into the guided via the portion 3b along the inner wall of the cylindrical nozzle blank 2 and presses the center located on the upper face of the bottom portion 2a of the cylindrical nozzle blank 2 as shown in FIG. 3B.

Figure 3C:
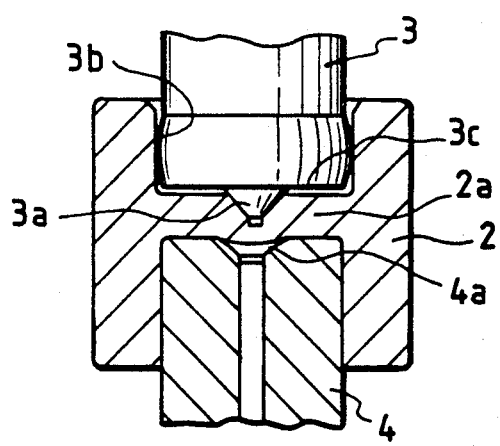
Figure 3D:
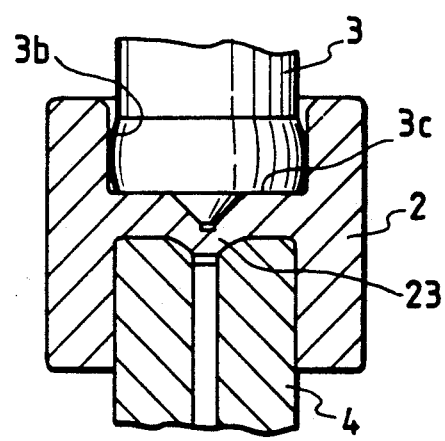

With the pressing of the punch 3 the plastic flow of the cylindrical nozzle blank 2 is initiated at the center on the upper face of the bottom portion 2a which is to be worked to begin the formation of the seat portion 1a, and the portion on the lower bottom face immediately below the portion on the upper bottom face where the seat portion is being formed is pushed out downward while being guided by the run off hole 4a provided on the die 4 as shown in FIG. 3C. The punch 3 lowers, until the flat face 3c serving as a stopper formed around the seat die 3a at the top end of the punch 3, contacts the upper face of the bottom portion 2a, then the transfer formation of the seat portion 1a on the bottom portion 2a is completed as shown in FIG. 3D.

After completing the transfer formation of the seat portion 1a, the upper slide 6 is raised, and the punch 3 is separated from the cylindrical nozzle blank 2 via the knock pins 7 and a stripper 8.

Subsequently, a projecting portion 23 punched out on the lower bottom face of the cylindrical nozzle blank 2 due to the plastic flow is removed, and thereafter the nozzle injection hold 9 is formed.

According to the present invention, even when nozzle blank 2 is made of a material that is not worked easily such as martensite series stainless steel, since the punch 3 is made of the cemented carbide having a die face coated with a ceramic harder than the material of the cylindrical nozzle blank 2, the transfer formation of the seat portion occurs without seizure.

Figure 4:
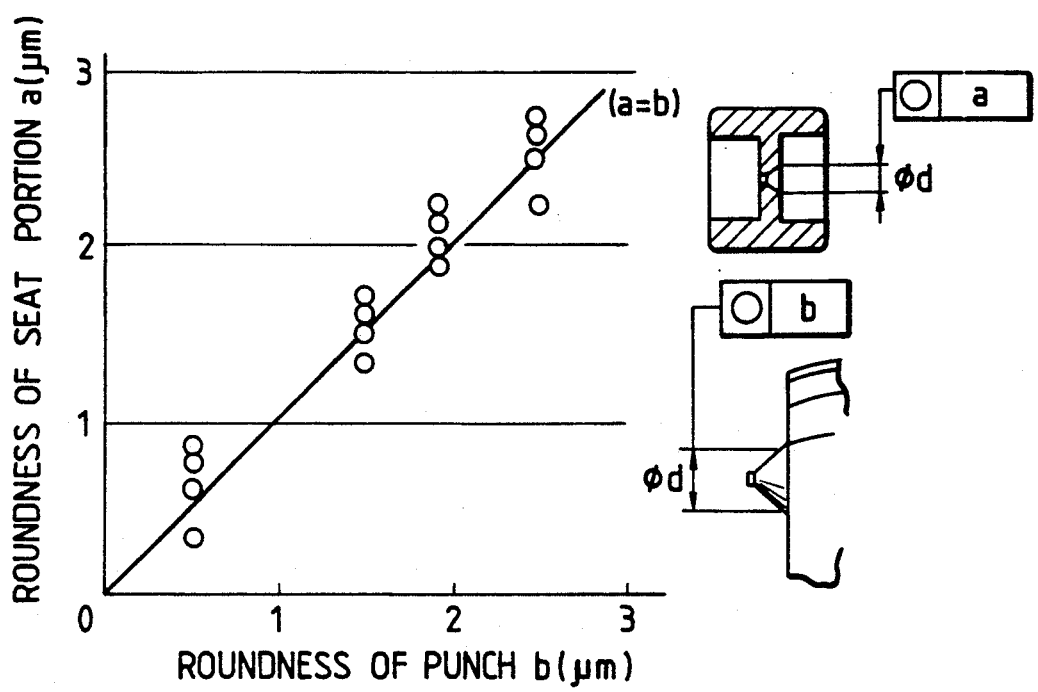
FIG. 4 is a graph for illustrating a relationship between the roundness of a punch used in the seat portion forming process in the first embodiment and the roundness of the resultant seat portion.

Further, the portion of the cylindrical nozzle blank 2 which is pushed out due to plastic flow during the transfer formation flows uniformly by the run off hole 4a toward one direction without experiencing a complex plastic flow; springback and residual stress in the resultant cylindrical nozzle is reduced, and the roundness of the seat portion 1a is formed with a high accuracy. FIG. 4 illustrates a result of the working accuracy of the seat portion 1a according to the transfer formation method of the present embodiment. One of the important accuracy requirements for the seat portion 1a is the roundness of the seat portion 1a, according to the present invention the roundness b of the punch 3 directly corresponds to the roundness a of the seat portion 1a of the cylindrical nozzle 1 so that the transfer formation of high accuracy is achieved as illustrated from FIG. 4.

When assuming that the top face of the die 4 is kept flat without forming the run off hole 4a, and the bottom portion 2a of the cylindrical nozzle blank 2 is pressed by the punch 3, the material of the portion 2a plastically flows into the circumferential direction of the cylindrical nozzle blank 2. The deformation resistance of the material dramatically increases in comparison with the present method, the lack of hole 4a necessarily increases the pressing force which must be applied to the punch 3 resulting in seizing and damage of to punch 3, and further even if the transfer formation could be completed, the roundness of the cylindrical nozzle 1 and seat portion 1a could not be obtained to a satisfactory degree.

Since the punch 3 is inserted and guided into inner space 2b-1 of the cylindrical nozzle blank 2 without any clearance during the transfer formation of the seat portion 1a, the concentricity of the inner diameter of the cylindrical nozzle 1 and the seat portion 1a is improved.

Figure 5:
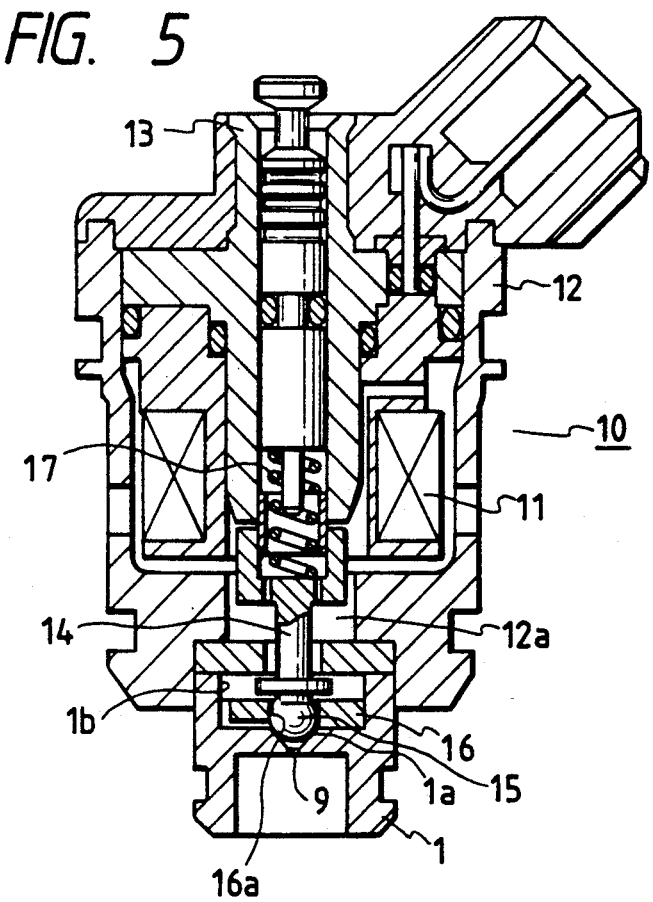
FIG. 5 is a cross section showing an example of a solenoid type fuel injection valve to which the nozzle produced in accordance with the present invention is incorporated.

In the fuel injection valve 10, the swirler 16 is fit within the cylindrical nozzle 1 as shown in FIG. 5, and the valve body 15 is reciprocated along a swirler inner diameter portion 16a into the axial direction such that the concentricity of the inner diameter of the cylindrical nozzle 1 with the seat portion 1a corresponds to an improvement of concentricity of the swirler inner diameter portion 16a and the valve body 15 with the seat portion 1a. This improvement is an important parameter for oil tightness together with the roundness of the seat portion 1a and surface roughness of the at portion 1a.

Figure 6:
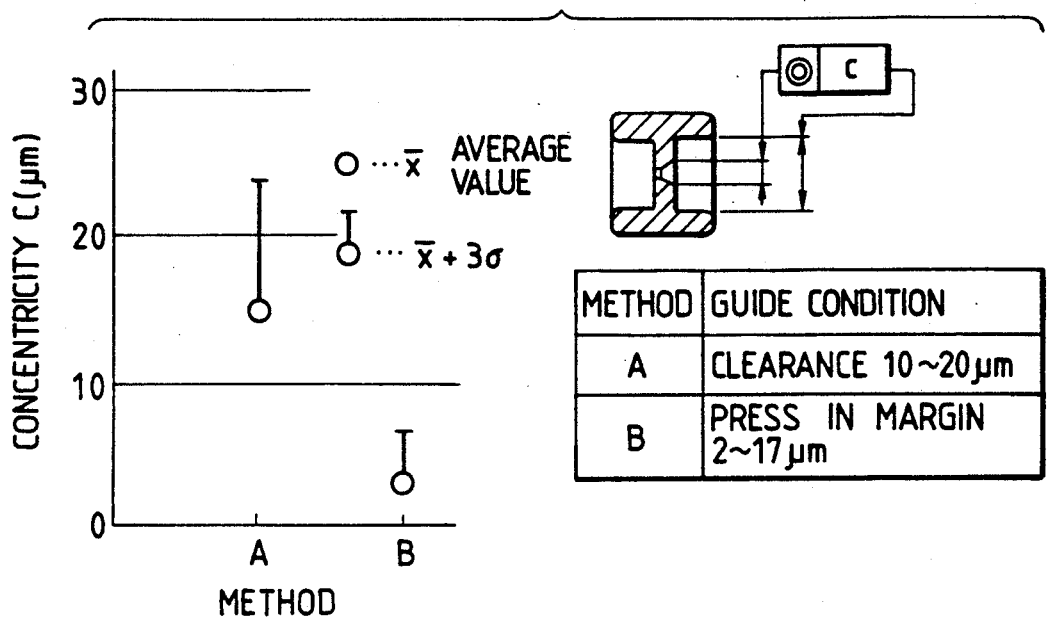
FIG. 6 is a graph illustrating the concentricity of the seat portion produced in accordance with the first embodiment of the present invention in comparison with that produced by a conventional method.

FIG. 6 shows a comparison between the transfer formation method of the seat portion 1a according to the present invention where the punch is guided while being pressed, and a transfer formation of an alternate method where the punch is guided into the cylindrical nozzle blank 2 with a clearance. In FIG. 6, method A represents the later method, and method B represents the former method as with the method of the present embodiment. In method A, the clearance of 10–20 μm between the cylindrical nozzle blank 2 and the punch 3 was used and in method B, the press in margin of 2–17 μm was used. As illustrated in FIG. 6, with the method B the concentricity of the inner diameter of the cylindrical nozzle with the seat portion 1a is improved from 15 μm to 3 μm in comparison with the method A.

Still further, according to the present invention, the surface roughness of the seat portion 1a is improved and a smooth flat seat surface is obtained only with the plastic work by pressing the punch while the present invention eliminates the conventional polishing work.

Therefore, according to the nozzle production method of the present invention a nozzle having excellent oil tightness, high accuracy and high quality is obtained. More specifically, the method of the present invention satisfies the requirements of roundness below 1 μm and of surface roughness below Rmax 1.0. Moreover a low cost press facility can be employed as the work facility, therefore the productivity of the cylindrical nozzle is improved reducing the production costs.

The transfer formation of the seat portion 1a is carried out before hardening of the seat portion 1a. For this reason, the roundness and surface roughness of the seat portion 1a may decrease due to deformation in the heat treatment. Such a possible slight decrease of the roundness and surface roughness due to the heat treatment does not result in problems in connection with the ordinary use solenoid valves. However, with regard to solenoid valve which is required of a highly accurate fuel injection and a very oil tight condition, the following treatment is added.

Figure 7:
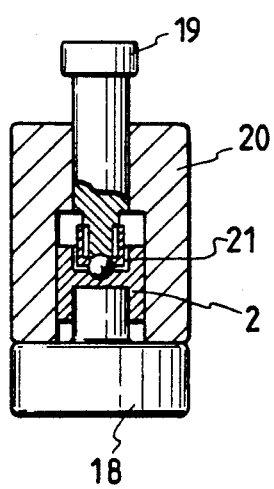
FIG. 7 illustrates a process in a second embodiment according to the present invention.

FIG. 7 shows an embodiment for counter measuring the deformation due to heat treatment. A female member 18 and a male member 19, both being press jigs, are set into a guide body 20 while constituting press jigs are set into a guide body 20 while interposing the heat treated cylindrical nozzle blank 2 therebetween. The male member 19 includes at the top end of the male member 19 a ball 21 having the same shape as the ball of the valve body 15. When the male member 19 is pressed onto the cylindrical nozzle blank 2 via a hydraulic press machine, the seat portion 1a is slightly plastic-deformed corresponding to the shape of the ball 21. With such measure the roundness as well as surface roughness of the seat portion 1a after the heat treatment is improved to enhance the oil tightness.

Figure 8:
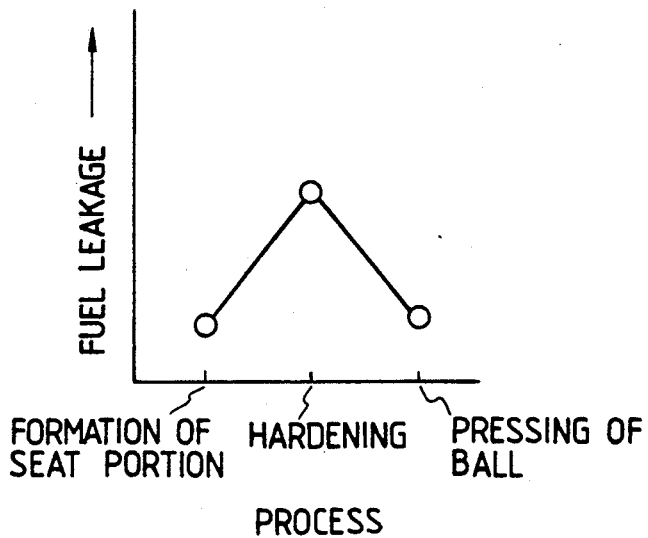
FIG. 8 is a graph showing the result achieved by the process explained with reference to FIG. 7.
Figure 9A:
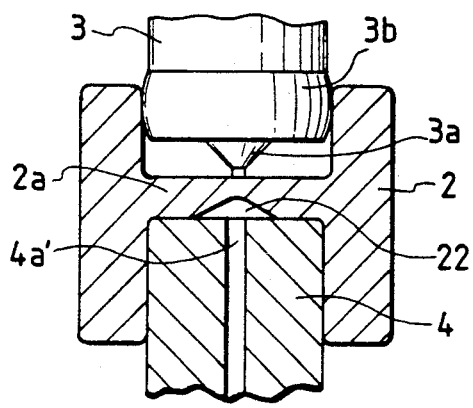
FIGS. 9A through 9D are views illustrating a process forming a seat portion on the upper bottom face of a cylindrical nozzle blank in a third embodiment according to the present invention.
Figure 9B:
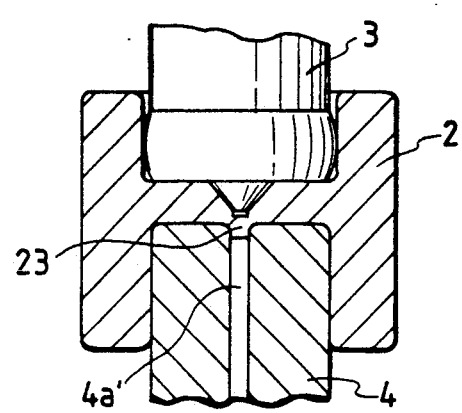
Figure 9C:
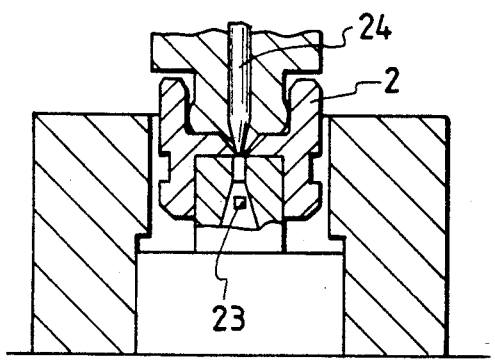
Figure 9D:
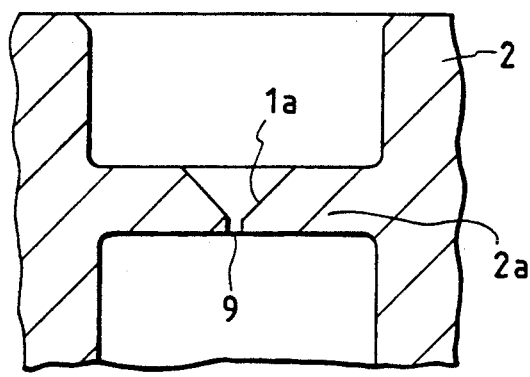

FIG. 8 shows a result of oil tightness improvement of the portion 1a according to the method of the present invention.

The fuel leakage amount representing oil tightness of the seat portion 1a after subjected to a hardening process increases, however decreasing after the ball pressing operation is carried out according to the present invention illustrated in from FIG. 8.

Since the ball pressing operation of the present invention is carried out after the hardening process, the hardness of the seat portion 1a is increased such that a relatively large pressing force is required for inducing a slight plastic deformation. The large pressing force requires that the ball 21 be made from cemented carbide. However, the ball 21 is only required to induce a limited local plastic deformation of the seat portion 1a such that the pressing force can be controlled so as to be as small as necessary.

Further, a ball 21 which is commercially available easily results in a seat portion having satisfactory accuracy. Still further a press machine having a low cost in comparison with the conventional facility for the fitting work using lapping or burnishing can be used, the productivity of the present embodiment including this further plastic work is also high and a low production cost of the cylindrical nozzle can also achieved.

FIGS. 9A through 9D are views for illustrating another embodiment of the nozzle production method according to the present invention. The difference of the present embodiment from the embodiment explained in connection with FIG. 1 through FIG. 3D is that the bottom portion 2a of the cylindrical nozzle blank 2 is provided at the center on the lower bottom face or back face with a recess 22 similar to the seat portion 1a. The recess 22 is similar to the transfer use die face 3a on the punch 3 before the formation of the seat portion 1a. Because of the existence of the recess 22, the projection 23 is pushed out on the lower bottom face of the cylindrical nozzle blank 2, and the plastic flow during transfer formation of the seat portion 1a is minimized. As a result of the recess 23, the run off hole 4a provided on die 4 for the plastic flow is small in comparison with the run off hole used in connection with FIGS. 3A through 3D.

By minimizing the projecting portion 23 which is pushed out from the lower bottom face of the cylindrical nozzle blank 2, as the injection hold 9 is bored from the center of the seat portion 1a toward the lower bottom face of the cylindrical nozzle blank 2 by use of a bore forming jig 24, the projecting portion 23 is removed simultaneously with the injection hole forming operation thereby the nozzle production process is further enhanced.

In the above embodiments martensite series stainless steel is used for the cylindrical nozzle blank, however other steel materials can be used depending upon the use of the solenoid valve.

We claim:

1. A method of producing a cylindrical nozzle with a valve seat for a solenoid valve, the method comprising the steps of:

providing a cylindrical nozzle blank of steel having a cylindrical side wall and a bottom at an intermediate portion along the axial direction of the cylindrical side wall on which bottom a valve seat portion for receiving a valve body is to be formed;

providing a punch of cemented carbide having a die on an end of said punch, for transfer forming the valve seat portion on said bottom of the cylindrical nozzle blank, said die being coated with a ceramic harder than the cylindrical nozzle blank;

providing another die of a rigid body having a run off hole in a face thereof to permit plastic flow of the cylindrical nozzle blank;

placing the cylindrical nozzle blank on the another die so that a lower face of the bottom of the cylindrical nozzle blank rests on the another die about said run off hole;

pressing the punch into the cylindrical nozzle blank while guiding an outer portion of the punch along an inner face of the cylindrical side wall of the cylindrical nozzle blank; and pressing the die on the punch onto an upper face of the bottom of the cylindrical nozzle blank to induce plastic flow of the bottom of the blank into the run off hole of said another die, thereby transfer forming the valve seat portion in said upper bottom face of the cylindrical nozzle blank.

2. A method of producing a cylindrical nozzle according to claim 1 further comprising the steps of:

removing a projection formed on the lower bottom face of the cylindrical nozzle blank resulting from the plastic flow;

boring a nozzle injection hole at a center of the transfer formed seat portion of the cylindrical nozzle blank from which the projection was removed; and hardening the bored cylindrical nozzle blank.

3. A method of producing a cylindrical nozzle according to claim 2, further comprising the step of:

pressing the valve seat portion of the hardened cylindrical nozzle blank with a press jig similarly shaped as valve body.

4. A method of producing a cylindrical nozzle according to claim 1, wherein the cylindrical nozzle blank is made of martensite series stainless steel.

5. A method of producing a cylindrical nozzle according to claim 1, wherein the ceramic coated over the die of the punch is selected from the group consisting of TiN, TiC and TiAlN.

6. A method of producing a cylindrical nozzle according to claim 1, wherein the die formed of the punch is a conical shape having a inclination angle $\theta_1$ smaller than the inclination angle $\theta_2$ defined by the run off hole of the another die.

7. A method of producing a cylindrical side wall and a bottom at an intermediate portion along the axial direction of the cylindrical side wall on which bottom a valve seat portion for receiving a valve body is to be formed;

a punch of cemented carbide having a die at one end of the punch, said die having a coating of a ceramic harder than the cylindrical nozzle blank for transfer forming the valve seat portion; and another die of a rigid body having a run off hole located in a face of the another die to permit plastic flow from the cylindrical nozzle blank;

forming a recess located at a center of a lower bottom face of the cylindrical nozzle blank to receive a pushed out portion from the plastic flow;

setting the cylindrical nozzle blank on the another die so that the lower bottom face of the cylindrical nozzle blank rests on the another die;

pressing the punch into the cylindrical nozzle blank while guiding an outer portion of the punch along an inner face of the cylindrical side wall of the cylindrical nozzle blank; and pressing the die on the punch onto an upper face of the bottom of the cylindrical nozzle blank to induce plastic flow to form the valve seat portion in the upper bottom face of the cylindrical nozzle blank and forming the pushed out portion in the recess.

8. A method of producing a cylindrical nozzle according to claim 7, further comprising the steps of:

boring a nozzle injection hole at a center of the seat portion of the cylindrical nozzle blank; and hardening the bored cylindrical nozzle blank.

9. A method of producing a cylindrical nozzle according to claim 8, further comprising the steps of:

pressing the seat portion of the hardened cylindrical nozzle blank with a press jig similarly shaped to the valve body.

10. A method of producing a cylindrical nozzle according to claim 7, wherein the cylindrical nozzle blank is made of martensite series stainless steel.

11. A method of producing a cylindrical nozzle according to claim 7, wherein the ceramic coated over the die of the punch is selected from the group consisting of TiN, TiC and TiAlN.

* * * * *